US008856909B1

(12) United States Patent
Chickering

(10) Patent No.: US 8,856,909 B1
(45) Date of Patent: Oct. 7, 2014

(54) IF-MAP PROVISIONING OF RESOURCES AND SERVICES

(75) Inventor: Roger A Chickering, Granite Bay, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1487 days.

(21) Appl. No.: 12/358,834

(22) Filed: Jan. 23, 2009

(51) Int. Cl.
 *H04L 29/06* (2006.01)
(52) U.S. Cl.
 USPC .................................... 726/10; 726/2
(58) Field of Classification Search
 USPC ................. 726/2, 4, 6, 10; 713/150
 See application file for complete search history.

(56) References Cited

U.S. PATENT DOCUMENTS

| | | | |
|---|---|---|---|
| 2003/0093691 A1* | 5/2003 | Simon et al. ................. | 713/201 |
| 2006/0179472 A1* | 8/2006 | Chang et al. .................... | 726/2 |
| 2007/0271598 A1* | 11/2007 | Chen et al. ........................ | 726/4 |
| 2009/0158407 A1* | 6/2009 | Nicodemus et al. .............. | 726/6 |

* cited by examiner

*Primary Examiner* — Jeffrey Pwu
*Assistant Examiner* — Thong Truong
(74) *Attorney, Agent, or Firm* — Harrity & Harrity, LLP

(57) ABSTRACT

A method may include receiving a request from an endpoint to access a network; granting access to the network; and subscribing to an IF-MAP server for updates relating to the endpoint. The method may also include receiving an update pertaining to the endpoint, from the IF-MAP server; and transmitting the update to the endpoint. Additionally, a method may include receiving a request from an endpoint to access a resource in a network; denying the request from the endpoint based on a security policy; and subscribing or querying to an IF-MAP server for IF-MAP data pertaining to the endpoint. The method may also include receiving from the IF-MAP server the IF-MAP data; and publishing, by the device, to the IF-MAP server, IF-MAP data pertaining to the endpoint, where the IF-MAP data includes security policy parameters that comply with the security policy for accessing the resource.

23 Claims, 5 Drawing Sheets

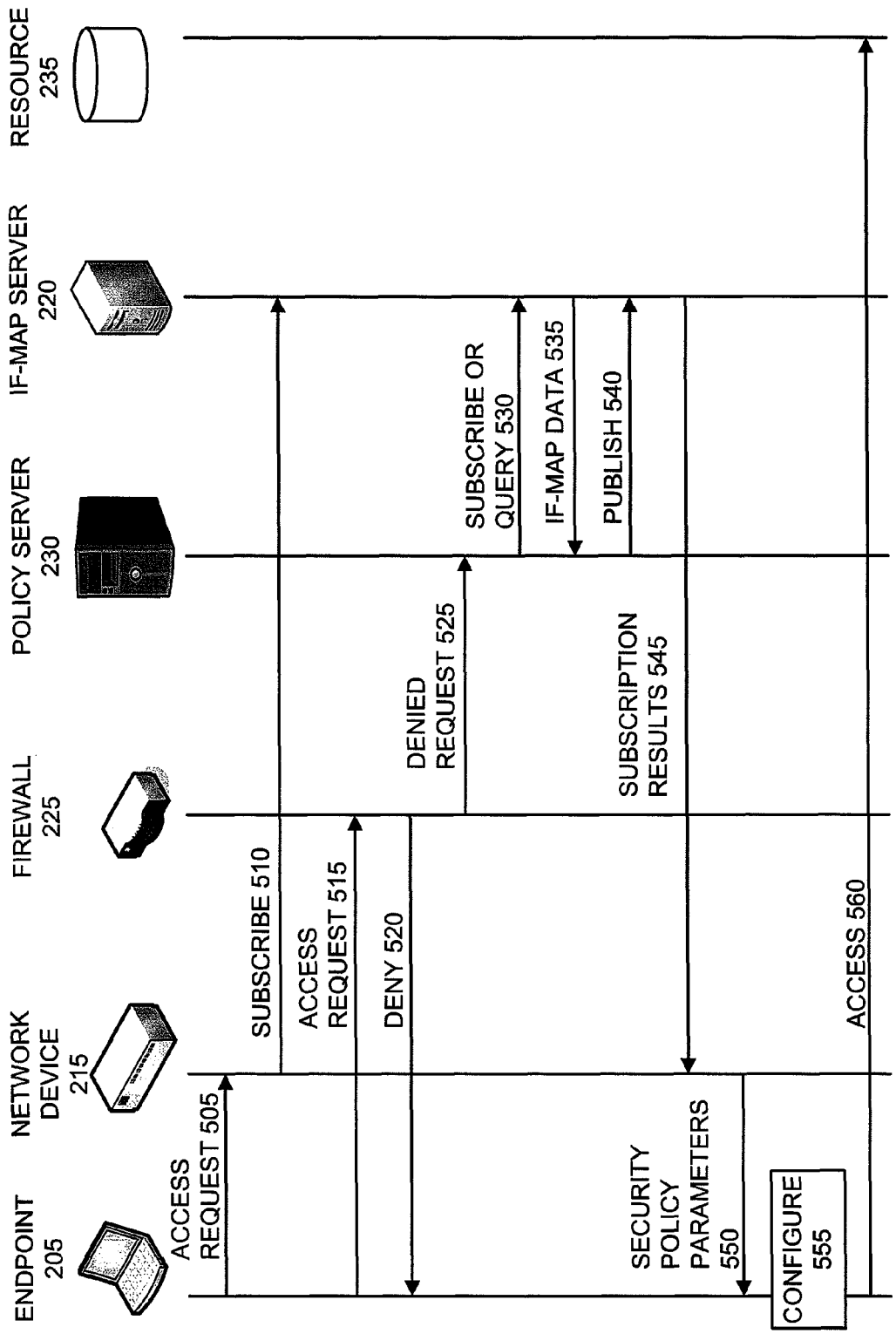

IF-MAP PROVISIONING OF RESOURCES AND SERVICES

BACKGROUND

The IF-MAP specification specifies a structured way to store, correlate, and retrieve identity, access control, and security information about users and devices on a network. In the IF-MAP framework, a database service may contain this type of information about users and devices connected to the network. An IF-MAP server may provide this database service. An IF-MAP client may participate in updating and querying the IF-MAP server based on a publish/subscribe/search communication model.

SUMMARY

According to one aspect, a method may be performed by a device. The method may include receiving, by the device, a request from an endpoint to access a network; granting, by the device, access to the network; subscribing, by the device, to an IF-MAP server for updates relating to the endpoint; receiving, by the device, an update pertaining to the endpoint, from the IF-MAP server; and transmitting, by the device, the update to the endpoint.

According to another aspect, a method may be performed by a device. The method may include receiving, by the device, a request from an endpoint to access a resource in a network; denying, by the device, the request from the endpoint based on a security policy; subscribing or querying, by the device, to an IF-MAP server for IF-MAP data pertaining to the endpoint; receiving, by the device, from the IF-MAP server the IF-MAP data; and publishing, by the device, to the IF-MAP server, IF-MAP data pertaining to the endpoint, where the IF-MAP data includes security policy parameters that comply with the security policy for accessing the resource.

According to yet another aspect, a method may be performed by a device. The method may include requesting, by the device, access to a resource in a network, which is initially denied; receiving, by the device, from an IF-MAP client in the network, security policy parameter updates that permit the device to access the resource; configuring, by the device, the received security policy parameter updates; and accessing, by the device, the resource in the network.

According to still another aspect, a network device may include a processor, a memory, a communication interface, and an IF-MAP client to receive a request from an endpoint to access a network, grant access to the network; subscribe to an IF-MAP server for updates relating to the endpoint; receive an update from the IF-MAP server; and transmit the update to the endpoint.

According to another aspect, a network device may include a processor, a memory, a communication interface, and an IF-MAP client to receive a request from an endpoint to access a resource in a network; determine whether to grant access to the resource based on a security policy; subscribe or query to an IF-MAP server for IF-MAP data pertaining to the endpoint when it is determined that access to the resource is not granted to the endpoint; receive the IF-MAP data from the IF-MAP server; and publish to the IF-MAP server, based on the received IF-MAP data, IF-MAP data pertaining to the endpoint that includes security policy parameters that comply with the security policy for accessing the resource.

According to yet another aspect, a computer-readable medium having stored thereon instructions, executable by at least one processor, may include one or more instructions to receive a request from an endpoint to access a network; one or more instructions for determining whether to grant the endpoint access to the network; one or more instructions for subscribing to an IF-MAP server for IF-MAP data updates pertaining to the endpoint when it is determined that the endpoint is granted access to the network; one or more instructions for receiving an IF-MAP data update from the IF-MAP server; and one or more instructions for transmitting update data to the endpoint.

According to still another aspect, a computer-readable medium having stored thereon instructions, executable by at least one processor, may include one or more instructions to receive a request from an endpoint to access a resource in a network; one or more instructions for determining whether to grant the request; one or more instructions for subscribing or querying to an IF-MAP server for IF-MAP data pertaining to the endpoint when the request is not granted; one or more instructions for receiving IF-MAP data from the IF-MAP server; one or more instructions for publishing, on the IF-MAP server, based on the IF-MAP data, IF-MAP data pertaining to the endpoint, where the IF-MAP data includes security policy parameters that will permit the endpoint to obtain access to the resource.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIG. 5 is a diagram illustrating exemplary messages for performing the exemplary process depicted in FIG. 4.

DETAILED DESCRIPTION

The following detailed description refers to the accompanying drawings. The same reference numbers in different drawings may identify the same or similar elements. Also, the following description does not limit the invention. Instead, the scope of the invention is defined by the appended claims and equivalents.

Overview

Methods, systems, and devices described herein may provide for the provisioning of secure network access to resources based on a session information device. In one implementation, an IF-MAP server may act as the session information device. In other implementations, the session information device may correspond to another type of device and/or specification that stores session information (e.g., state information with respect to an endpoint device) comparable to or a variant of the IF-MAP specification.

Figure 1:
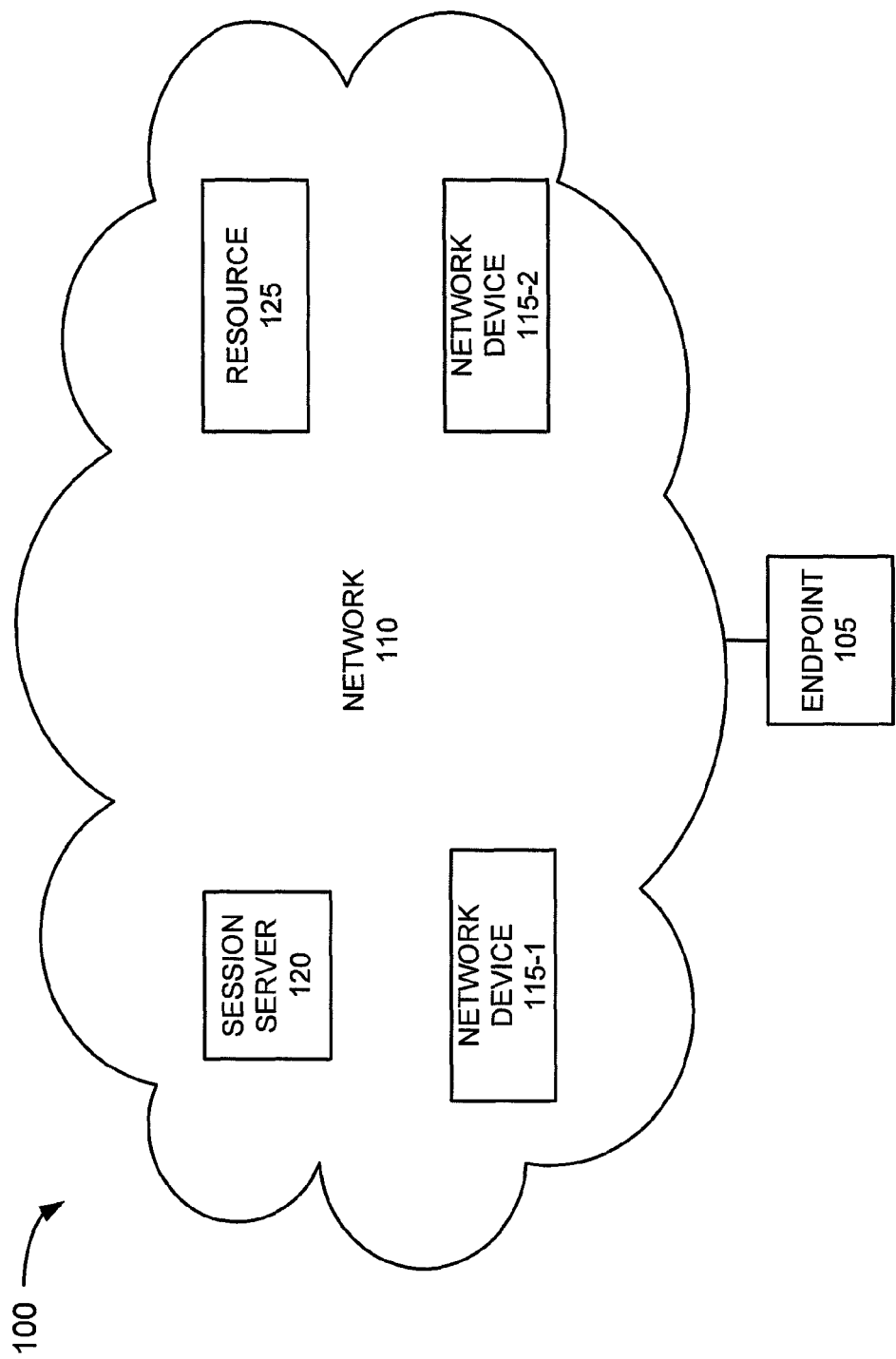
FIG. 1 is a diagram illustrating an exemplary environment in which aspects described herein may be implemented.

FIG. 1 is a diagram illustrating an exemplary environment 100 in which aspects described herein may be implemented. As illustrated in FIG. 1, an exemplary environment 100 may include an endpoint 105 and a network 110 that may include network devices 115-1 and 115-2, a session server 120, and a resource 125. Environment 100 may include wired and/or wireless connections among the devices.

In an exemplary scenario, endpoint 105 may obtain authorization to access network 110 from network device 115-1. Network device 115-1 may subscribe to updates, from session server 120, pertaining to state information of endpoint 105. For example, an update to state information may include security policy parameters (e.g., Internet Protocol Security (IPsec) policy parameters) within network 110.

Endpoint 105 may attempt to access resource 125 via network device 115-2 utilizing an unsecured communication link. Network device 115-2 may serve as an enforcement point to resource 125. Network device 115-2 may deny endpoint 105 access to resource 125 because endpoint 105 attempted to access resource 125 over the unsecured communication link. Subsequently, network device 115-2 may subscribe to or query for state information of endpoint 105. Session server 120 may provide the state information of endpoint 105 to network device 115-2. Network device 115-2 may determine, based on the state information, whether endpoint 105 should be permitted to access resource 125. For purposes of discussion, assume that network device 115-2 determines that endpoint 105 should be permitted to access resource 125, but was denied because endpoint 105 needs to access resource 125 over a secured communication link. Network device 115-2 may then add security policy parameters (e.g., IPsec policy parameters) to state information of endpoint 105, which is maintained by session server 120. The security policy parameters will permit endpoint 105 to access resource 125 over a secured communication link.

Based on the update (i.e., the adding of security policy parameters) to state information of endpoint 105, session server 120 may transmit to network device 115-1 the added security policy parameters, since network device 115-1 subscribed for state information updates. Upon receipt, network device 115-1 may, in turn, transmit the added security policy parameters to endpoint 105. Endpoint 105 may configure the security policy parameters. Thereafter, endpoint 105 may establish a secure communication link to resource 125 via network device 115-2. Endpoint 105 may utilize resource 125.

As a result of the foregoing, security policy parameters may be provisioned to various devices in a network based on the session information device. Since the methods, systems, and devices have been broadly described, variations exist and will be described further below. Additionally, although the foregoing overview refers to IPsec for providing a secure communication link, the methods, systems, and devices described herein are not dependent on utilizing this protocol or any other particular security-based protocol.

Exemplary Environment

Figure 2:
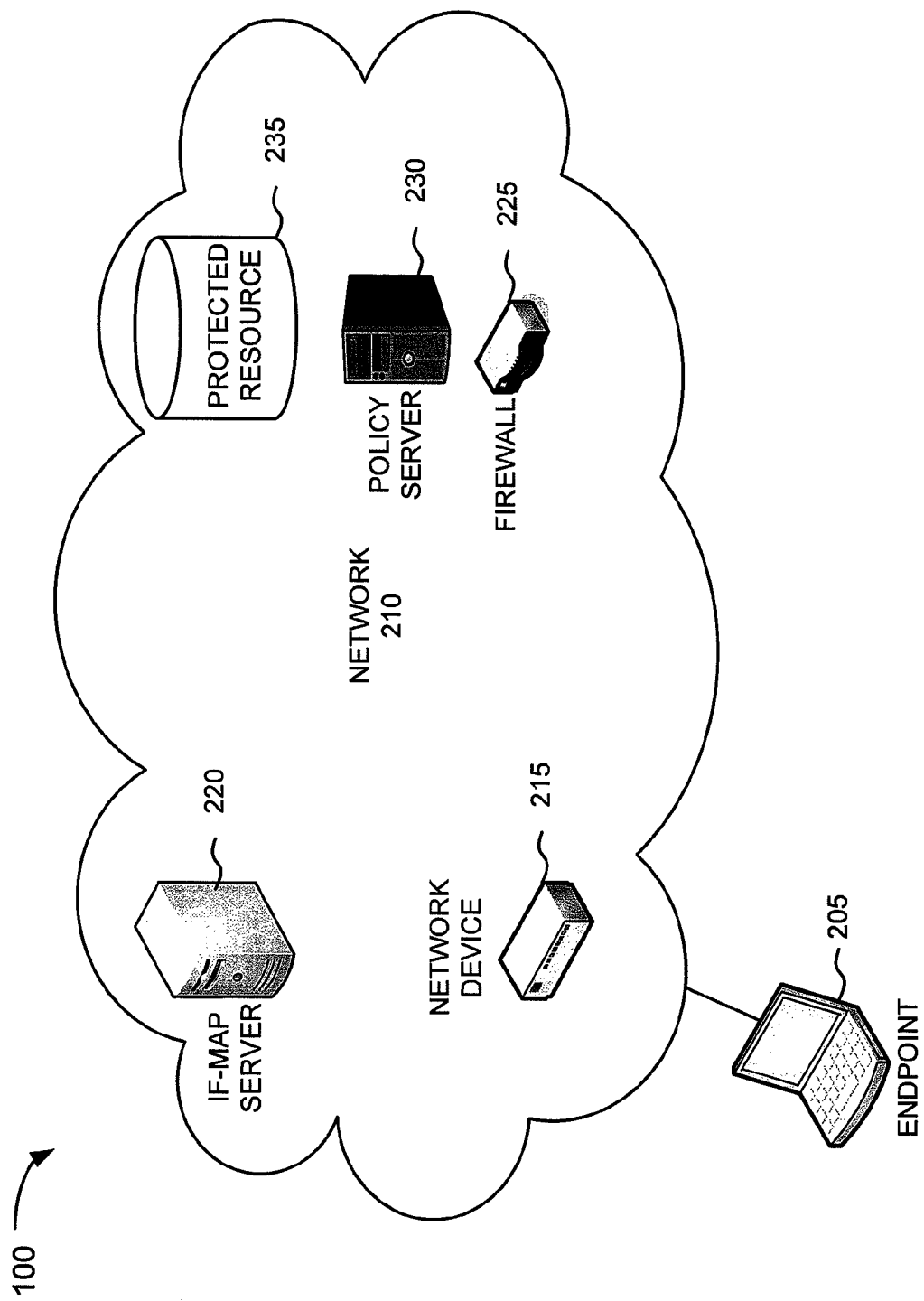
FIG. 2 is a diagram illustrating an exemplary implementation of the environment depicted in FIG. 1.

FIG. 2 is a diagram illustrating an exemplary implementation of environment 100 in which methods, systems and devices described herein may be implemented. As illustrated in FIG. 2, exemplary environment 100 may include an endpoint 205, a network 210 that includes a network device 215, an IF-MAP server 220, a firewall 225, a policy server 230, and a protected resource 235. In such an implementation, network device 215 may correspond to network device 115-1, IF-MAP server 220 may correspond to session server 120, and firewall 225 and/or policy server 230 may correspond to network device 115-2.

Endpoint 205 may include a device having communication capability. For example, endpoint 205 may include a computer (e.g., a desktop computer, a laptop computer, or a handheld computer) or some other type of user device.

Network 210 may include any type of network, such as, for example, a local area network (LAN), a wide area network (WAN), a telephone network (e.g., a public switched telephone network (PSTN) or a wireless communication network), the Internet, a private network, etc., or a combination of networks. Network 210 may include various devices that permit communication to take place via a wired and/or wireless media.

Network device 215 may include a device that has communication capability. Network device 215 may, for example, correspond to an access point to network 210. Network device 215 may include one or multiple devices. For example, network device 215 may include a router, a bridge, a switch, a gateway, a firewall, an intrusion detection and prevention (IDP) device, a policy server, and/or some other type of network device and/or security device. Network device 215 may include various interfaces and/or support various communication protocols (e.g., IP, IPsec, H.323, IF-MAP, Remote Authentication Dial In User Service (RADIUS), etc.). Network device 215 may include an IF-MAP client (not shown). Network device 215 may perform various functions (e.g., authentication of endpoints, health checks, and/or other forms of access procedures).

IF-MAP server 220 may include a device having communication capability and may operate according to the IF-MAP specification. Given the expansive nature of the IF-MAP specification, the IF-MAP specification will not be described herein in detail. However, as previously mentioned, the IF-MAP specification creates a structured way to store, correlate, and retrieve identity, access control, and security information about users and devices on a network. The IF-MAP specification provides a standardized framework for network and security devices to publish state information (e.g., authentication information, network address information (e.g., an IP address, a Medium Access Control (MAC) address, etc.), user name, and other types of meaningful information to a central repository (i.e., an IF-MAP server) that may be utilized. For example, the data stored on IF-MAP server 220 may be searched by the IF-MAP client. A computer and/or some other type of network device may include an IF-MAP server.

Firewall 225 may include a security device having communication capability. Firewall 225 may, among other things, permit or deny access to resources (e.g., protected resource 235) in network 210.

Policy server 230 may include a security device having communication capability. Policy server 230 may, among other things, provide authorization services and/or control access requests for endpoints based on network policies. Policy server 230 may include an IF-MAP client (not shown). It will be appreciated that firewall 225 and/or policy server 230 may be combined into a single device, and correspond to network device 115-2 of FIG. 1. Protected resource 235 may include any resource (e.g., data, a service, etc.).

Although FIG. 2 illustrates an exemplary implementation of environment 100, in other implementations, environment 100 may include fewer, additional, and/or different devices, or differently arranged devices than those illustrated in FIG. 2. Thus, it will be appreciated that environment 100 is exemplary in terms of, among other things, the number of devices, the type of devices, etc. Additionally, or alternatively, in other implementations, one or more operations described as being performed by a specific device may be performed by, for example, one or more other devices or, in combination with one or more other devices. Further, it will be appreciated that an operation and/or a process described herein may be performed in a distributed or a centralized manner.

Exemplary Device Architecture

Figure 3:
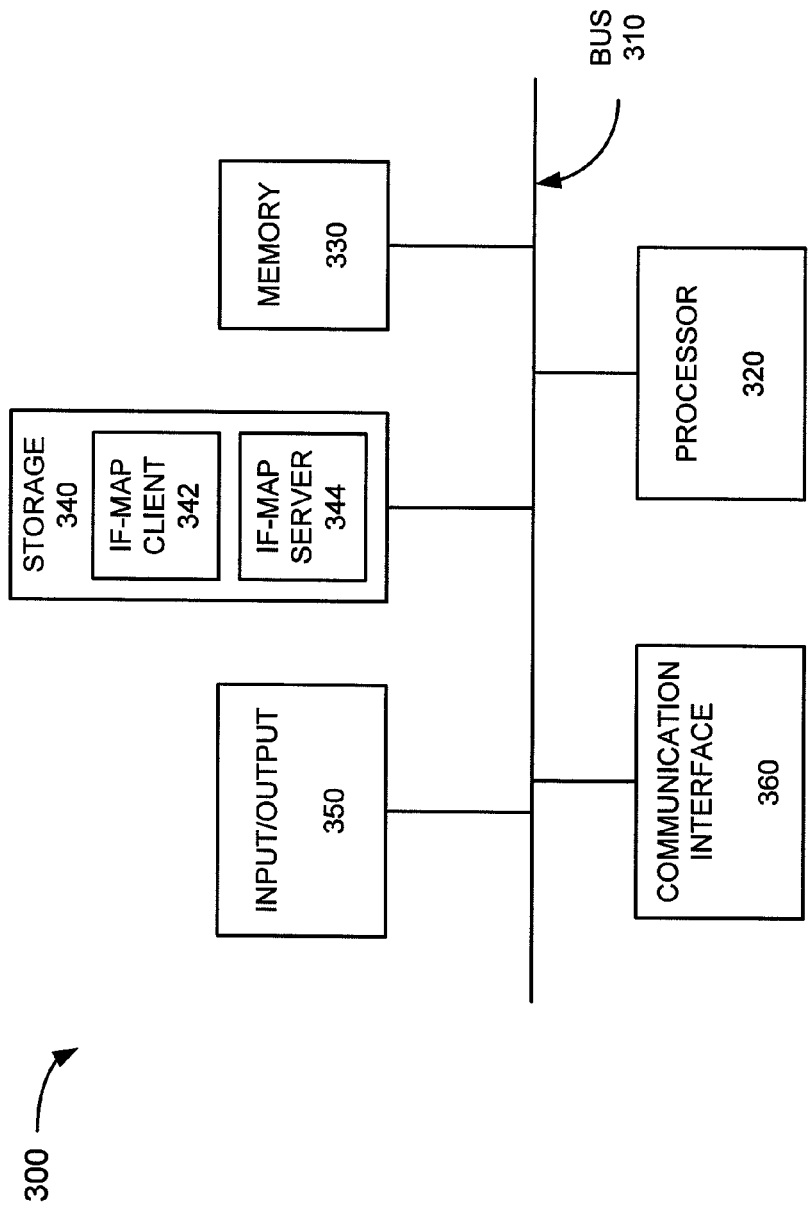
FIG. 3 is a diagram illustrating exemplary components of a device that may correspond to one or more devices depicted in FIGS. 1 and 2.

FIG. 3 is a diagram illustrating exemplary components of a device 300 that may correspond to one or more of the devices depicted in FIG. 2. For example, device 300 may correspond to endpoint 205, network device 215, IF-MAP server 220, firewall 225, and/or policy server 230. As illustrated, device 300 may include, for example, a bus 310, a processor 320, a memory 330, storage 340, an input/output 350, and a communication interface 360.

Bus 310 may permit communication among the other components of device 300. For example, bus 310 may include a system bus, an address bus, a data bus, and/or a control bus. Bus 310 may also include bus drivers, bus arbiters, bus interfaces, and/or clocks.

Processor 320 may interpret and/or execute instructions and/or data. For example, processor 320 may include a general-purpose processor, a microprocessor, a data processor, a co-processor, a network processor, an application specific integrated circuit (ASIC), a controller, a programmable logic device, a chipset, a field programmable gate array (FPGA), or some other processing logic that may interpret and/or execute instructions.

Memory 330 may store data and/or instructions. For example, memory 330 may include a random access memory (RAM), a dynamic random access memory (DRAM), a static random access memory (SRAM), a synchronous dynamic random access memory (SDRAM), a read only memory (ROM), a programmable read only memory (PROM), an erasable programmable read only memory (EPROM), an electrically erasable programmable read only memory (EEPROM), another type of dynamic or static memory, a cache, and/or a flash memory.

Storage 340 may store data and/or software applications. For example, storage 340 may include a hard disk (e.g., a magnetic disk, an optical disk, a magneto-optic disk, etc.), a compact disc (CD), a digital versatile disc (DVD), a floppy disk, a cartridge, a magnetic tape, a flash drive, or another type of computer-readable medium, along with a corresponding drive. The term "computer-readable medium" is intended to be broadly interpreted to include, for example, memory or storage. A computer-readable medium may be implemented in a single device, multiple devices, centralized, or distributed manner.

Storage 340 may store an IF-MAP client 342 or an IF-MAP server 344. For example, as previously described, network device 215 and policy server 230 may include IF-MAP client 342, while IF-MAP server 220 may include IF-MAP server 344. By way of example, IF-MAP client 342 and IF-MAP server 344 may be implemented as software executable by hardware (e.g., processor 320).

Memory 330 and/or storage 340 may also include storage external to and/or removable from device 300, such as a Universal Serial Bus (USB) memory stick, a hard disk, etc.

Input/output 350 may permit input to and output from device 300. For example, input/output 350 may include a keyboard, a keypad, a mouse, a button, a switch, a microphone, voice recognition logic, a pen, a display, a port, or the like to permit input. Additionally, or alternatively, input/output 350 may include a display, a speaker, one or more light emitting diodes (LEDs), a port, or the like, to permit output.

Communication interface 360 may enable device 300 to communication with another device(s), a network, and/or another system. For example, communication interface 360 may include an Ethernet interface, an optical interface, a coaxial interface, a wireless interface, or the like. Communication interface 360 may include a transceiver.

Device 300 may perform operations and/or processes associated with the provisioning of secure network access to resources based on a session information device. According to an exemplary implementation, device 300 may perform these operations and/or processes in response to processor 320 executing sequences of instructions contained in a computer-readable medium. For example, software instructions may be read into memory 330 from another computer-readable medium, such as storage 340, or from another device via communication interface 360. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Although, FIG. 3 illustrates exemplary components of device 300, in other implementations, device 300 may include fewer, additional, different, and/or differently arranged components than those depicted in FIG. 3. In still other implementations, one or more operations described as being performed by a particular component may be performed by one or more other components.

Exemplary Process

Figure 4:
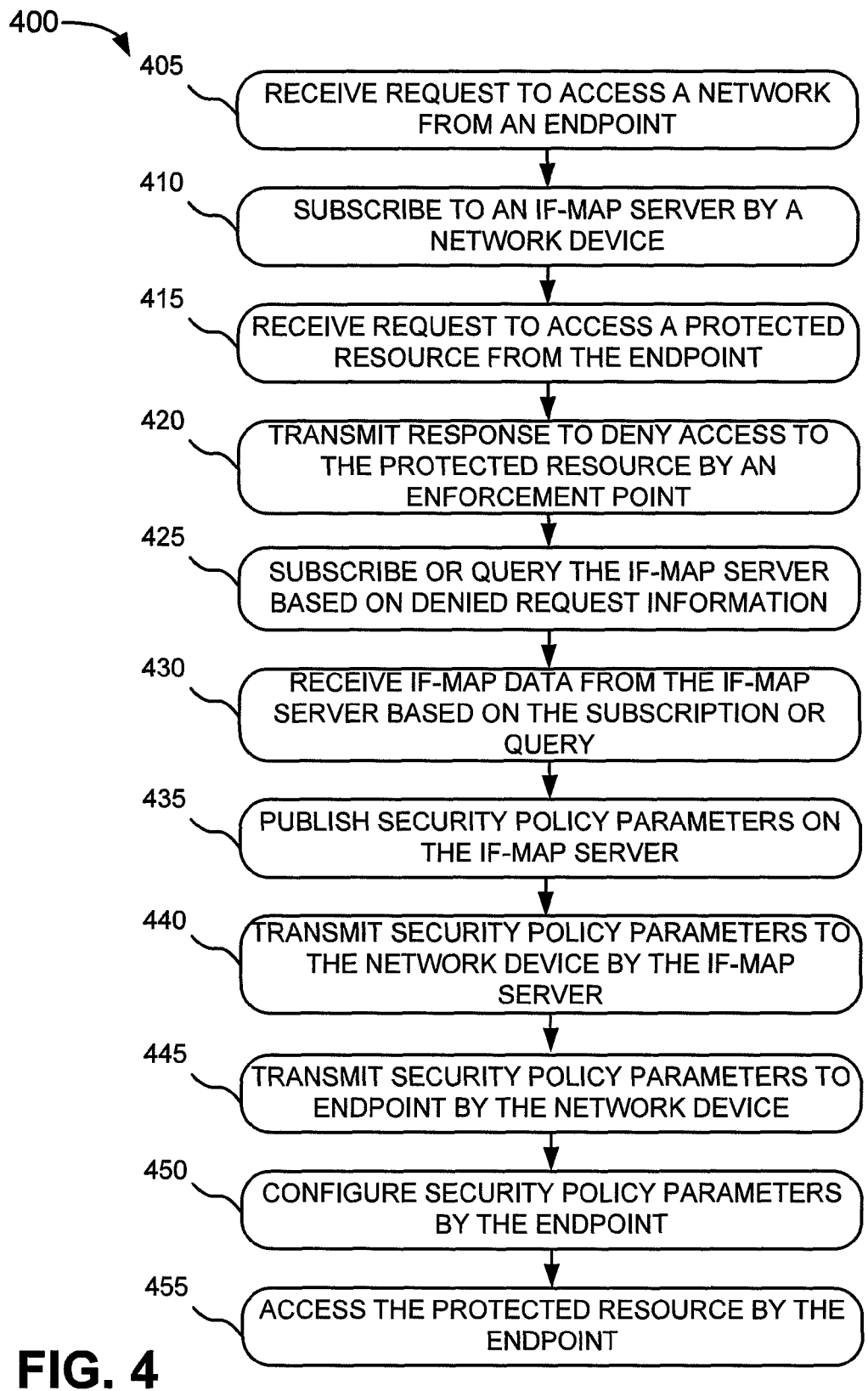
FIG. 4 is a flow diagram illustrating an exemplary process for provisioning security network access to resources based on a session information device.

FIG. 4 is a flow diagram illustrating an exemplary process 400 for provisioning secure network access to resources based on a session information device. Process 400 will be described in conjunction with other figures. FIG. 5 is a diagram that illustrates exemplary messages that may be used for performing exemplary process 400. For purposes of discussion, the session information device corresponds to IF-MAP server 220.

Process 400 may begin with an endpoint requesting access to a network (block 405). For example, as illustrated in FIG. 5, endpoint 205 may transmit an access request 505 to network device 215. For purposes of discussion, network device 215 may grant endpoint 205 access to network 210. However, it will be appreciated that network device 215 may perform various operations before granting access to endpoint 205. For example, network device 215 may perform various security measures (e.g., authentication, health check, etc.) before granting access. Additionally, or alternatively, network device 215 may obtain information related to endpoint 205 (e.g., network address information, device attribute information, etc.).

A network device may subscribe to an IF-MAP server (block 410). For example, as illustrated in FIG. 5, IF-MAP client 342 of network device 215 may subscribe 510 to IF-MAP server 220. The subscription may require that IF-MAP server 220 provide updates to network device 215 relating to endpoint 205. By way of example, these updates may include security-related updates (e.g., IPsec policy parameters). Additionally, although not illustrated, IF-MAP client 342 of network device 215 may publish session information, relating to endpoint 205, to IF-MAP server 220. The session information may include, for example, information related to endpoint 205 (e.g., network address, device attribute information, etc.), security information (e.g., authentication information, encryption information, etc.), and/or other forms of information (e.g., metadata, identifiers, vendor-specific, etc.) consistent with the IF-MAP specification.

A request to access a protected resource may be received from the endpoint (block 415). For example, as illustrated in FIG. 5, endpoint 205 may transmit an access request 515 to protected resource 235 via firewall 225. For purposes of discussion, assume that endpoint 205 attempts to access protected resource 235 over an unsecured communication link.

A denial to access the protected resource may be transmitted by an enforcement point (block 420). For example, as illustrated in FIG. 5, firewall 225 may deny 520 endpoint 205 access to protected resource 235. As further illustrated in FIG. 5, firewall 225 may provide policy server 230 with information (e.g., denied request 525) associated with the denial 520. For example, the information may include a network address of endpoint 205 (e.g., source IP of dropped packet), a network address associated with the destination (i.e., protected resource 235), and the policy that caused the denial of access. In this example, assume that the security policy that caused the denial of access is that access to protected resource 235 is only permissible over a secured communication link (e.g., an IPsec link). The information may also include, for example, the interface of firewall 225 that received the access request 515.

The enforcement point may subscribe to or query the IF-MAP server based on the denied request information (block 425). For example, as illustrated in FIG. 5, IF-MAP client 342 of policy server 530 may subscribe or query 530 to IF-MAP server 220 for IF-MAP data relative to the network address of endpoint 205. IF-MAP client 342 of policy server 530 may identify the network address of endpoint 205 based on the denied request 525 received from firewall 225.

IF-MAP data from the IF-MAP server may be received based on the subscription or the query (block 430). For example, as illustrated in FIG. 5, IF-MAP server 220 may transmit IF-MAP data 535 to policy server 230 based on the subscription or the query of policy server 230. IF-MAP data 535 may include device information, security information, and/or other types of information according to the IF-MAP specification. For example, IF-MAP data 535 may include the network address associated with access request 515 of endpoint 205, authentication information, device attributes of endpoint 205, identifiers (e.g., access request identifiers), metadata (e.g., role information), etc., associated with endpoint 205.

Security policy parameters may be published on the IF-MAP server (block 435). Based on IF-MAP data 535 and its security policies, policy server 230 may determine that endpoint 205 should be permitted to access protected resource 235. By way of example, policy server 230 may consult its security policies for network 210 and determine in order for traffic to flow from endpoint 205 through firewall 225, endpoint 205 requires the IPsec protocol. Policy server 230 may select the security policy parameters that comply with the security policy for accessing protected resource 235. Policy server 230 may have knowledge, based on IF-MAP data 535 and/or denied request 525, that endpoint 205 is currently not configured with IPsec policy parameters. Accordingly, as illustrated in FIG. 5, IF-MAP client 342 of policy server 230 may publish 540 security policy parameters (e.g., IPsec policy parameters) on IF-MAP server 220. The IPsec security policy parameters may include, for example, a network address of firewall 225, a network address of protected resource 235, a network address of endpoint 205, the IPsec protocol, credentials (e.g., username and password), etc.

Security policy parameters may be transmitted to the network device by the IF-MAP server (block 440). For example, as illustrated in FIG. 5, IF-MAP server 344 of IF-MAP server 220 may transmit subscription results 545 to IF-MAP client 342 of network device 215 according to the subscribe 510 (previously described in block 410). The subscription results 545 include the security policy parameters published by policy server 230.

Security policy parameters may be transmitted to the endpoint by the network device (block 445). For example, as illustrated in FIG. 5, network device 215 may transmit security policy parameters 550 to endpoint 205.

Security policy parameters may be configured by the endpoint (block 450). For example, as illustrated in FIG. 5, endpoint 205 may configure 555 the security policy parameters 550 received from network device 215.

The protected resource may be accessed by the endpoint (block 455). For example, as illustrated in FIG. 5, endpoint 205 may access 560 protected resource 235 in accordance with the configured security policy parameters 550.

Although FIG. 4 illustrates an exemplary process 400, in other implementations, fewer, additional, or different operations may be performed.

CONCLUSION

The foregoing description of implementations provides an illustration, but is not intended to be exhaustive or to limit the implementations to the precise form disclosed. Modifications and variations are possible in light of the above teachings or may be acquired from practice of the teachings.

In addition, while a series of blocks has been described with regard to the process illustrated in FIG. 4, the order of the blocks may be modified in other implementations. Further, non-dependent blocks may be performed in parallel.

Also, certain aspects have been described as being implemented as "logic" or a "component" that performs one or more functions. This logic or component may include hardware, such as a processor, microprocessor, an ASIC, or a FPGA, or a combination of hardware and software, such as a processor/microprocessor executing instructions stored in a memory.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

The term "may" is used throughout this application and is intended to be interpreted, for example, as "having the potential to," "configured to," or "being able," and not in a mandatory sense (e.g., as "must"). The terms "a," "an," and "the" are intended to be interpreted to include one or more items. For example, a processor 302 may include one or more processors. Where only one item is intended, the term "one" or similar language is used. Further, the phrase "based on" is intended to be interpreted as "based, at least in part, on," unless explicitly stated otherwise. The term "and/or" is intended to be interpreted to include any and all combinations of one or more of the associated list items.

Even though particular combination of features are recited in the claims and/or disclosed in the specification, these combinations are not intended to limit the disclosure of the invention. In fact, many of these features may be combined in ways not specifically recited in the claims and/or disclosed in the specification.

No element, block, or instruction used in the present application should be construed as critical or essential to the implementations described herein unless explicitly described as such.

What is claimed is:

1. A method performed by a first device, the method comprising:
   receiving, by the first device, a request from an endpoint to access, via a network associated with the first device, a resource protected by a second device that differs from the first device;
   authenticating, by the first device and based on the request, the endpoint to obtain first authentication information, the first authentication information enabling the endpoint to access the network;
   forwarding, by the first device, the first authentication information to the endpoint;
   determining, by the first device and based on the request, that the endpoint is unauthorized, by the second device, to access the resource;
   forwarding, by the first device based on determining that the endpoint is unauthorized to access the resource, the first authentication information to a network admission control (NAC) device associated with the network, the NAC device being different from the first device and the second device, the NAC device generating second authentication information based on the first authentication information, and the second authentication information enabling the endpoint to access the resource through the second device;
   requesting, by the first device and from the NAC device, the second authentication information;
   receiving, by the first device and from the NAC device, the second authentication information; and
   transmitting, by the first device, the second authentication information to the endpoint.

2. The method of claim 1, where the second authentication information corresponds to security policy parameters to access the resource through the second device.

3. The method of claim 1, where the NAC device includes an interface for metadata access points (IF-MAP) server, and where the method further comprises:
   determining, by the first device, IF-MAP data pertaining to the endpoint based on the request; and
   publishing, by the first device, the IF-MAP data pertaining to the endpoint to the IF-MAP server,
   the IF-MAP server determining the second authentication information based on the published IF-MAP data pertaining to the endpoint.

4. A method performed by a device, the method comprising:
   receiving, by the device, a request from an endpoint to access a resource in a network;
   evaluating, by the device, the request from the endpoint based on a security policy;
   determining, by the device, information about the endpoint based on the request;
   requesting, by the device and from a network admission control (NAC) device, authentication data pertaining to access to the resource by the endpoint;
   receiving, by the device and from the NAC device, the authentication data;
   determining, by the device and based on the authentication data, that the endpoint is unauthorized to access the resource; and
   publishing, by the device and based on determining that the endpoint is unauthorized to access the resource, data pertaining to the endpoint to the NAC device, the published data including:
      the determined information about the endpoint, and
      security policy parameters associated with the security policy,
   the published data enabling another device to authorize the endpoint to access the resource.

5. The method of claim 4, where the device includes at least one of:
   a security device,
   a firewall, or
   a policy server, and
   where access to the resource protected by the other device.

6. The method of claim 4, where the security policy parameters are based on the request, the security policy, and the authentication data.

7. The method of claim 4, where requesting the authentication data comprises:
   obtaining additional information associated with the endpoint based on the request from the endpoint to access the resource; and
   utilizing the additional information associated with the endpoint to request the authorization data from the NAC device.

8. A method performed by a first device, the method comprising:
   sending, by the first device and to a second device, a request to access, via a network associated with the second device, a resource protected by a third device that differs from the first device and the second device;
   receiving, by the first device, first authorization information from the second device, the first authorization information enabling the first device to access the network;
   receiving, by the first device and when accessing the network, an indication that the third device is denying access to the resource by the first device;
   requesting, by the first device based on receiving the indication, access to the resource, the requesting of the access including:
      providing, by the first device, second authentication information to a network admission control (NAC) device associated with the network, the NAC device being different from the first device and the second device, and the second authentication information relating to accessing the resource through the third device;
   receiving, by the first device and from the second device, security policy parameter information that permits the first device to access the resource, the security policy parameter information being based on the second authentication information;
   accessing, by the first device, the resource in the network based on the received security policy parameter information.

9. The method of claim 8, where the first device includes an endpoint, the second device includes a gateway device, and the NAC device includes an interface for metadata access points server.

10. A network device, comprising:
    a processor to:
       receive a request from an endpoint to access, via a network associated with the network device, a resource protected by a device that differs from the network device;

generate, based on the request, first authentication information that enables the endpoint to access the network;
enable, based on the first authentication information, the endpoint to access to the network;
determine, based on the request, that the endpoint is unauthorized, by the device, to access the resource;
subscribe, based on determining that the endpoint is unauthorized to access the resource, to a network admission control (NAC) device to receive second authentication information associated with the endpoint, the NAC device being different from the network device and the device, and the second authentication information relating to access, by the endpoint, to the resource through the device;
receive, from the NAC device, the second authentication information associated with the endpoint; and
transmit the second authentication information to the endpoint.

11. The network device of claim 10, where the second authentication information includes security policy parameters that will enable the endpoint to access the resource via the network and the device.

12. The network device of claim 10, where the network device includes at least one of:
a server,
a router, or
a security device,
where the NAC device includes an interface for metadata access points (IF-MAP) server, and
where the processor is further to:
determine IF-MAP data pertaining to the endpoint based on the request; and
publish the IF-MAP data pertaining to the endpoint to the IF-MAP server,
the IF-MAP server determining the second authentication information based on the published IF-MAP data pertaining to the endpoint.

13. A network device, comprising:
a processor to:
receive a request, from an endpoint, to access a resource in a network;
determine to deny access, by the endpoint, to the resource based on the request and a security policy for accessing the resource;
request, based on denying the access and from a network admission control (NAC) device, authentication data pertaining to the endpoint;
receive the authentication data from the NAC device; and
publish, to the NAC device and based on the received authentication data, data pertaining to the endpoint, the published data including:
information associated with the request, and
security policy parameters associated with the security policy for accessing the resource,
the published data enabling another device to authorize the endpoint to access the resource.

14. The network device of claim 13, where the security policy is associated with a secure communication link from the endpoint to access the resource, and
where the processor, when determining to deny access to the resource, is further to determine whether the request is received via the secure communication link.

15. The network device of claim 13, where, when requesting the authentication data, the processor is further to:

identify a network address associated with the endpoint based on the request to access the resource; and
request, from the NAC device, the authentication data based on the network address.

16. The network device of claim 13, where, when publishing the data, the processor is further to:
determine, based on the received authentication data, that the endpoint is permitted to access the resource; and
enable, based on determining that the endpoint is permitted to access the resource, the endpoint to access the resource based on the security policy parameters associated with the network security policy for accessing the resource.

17. The network device of claim 13, where the network device includes at least one of:
a server device,
a firewall, or
a policy server, and
where the NAC device includes an interface for metadata access points (IF-MAP) server, and
where the authentication data includes IF-MAP data.

18. A non-transitory computer-readable medium comprising:
one or more instructions which, when executed by a first network device, cause the first network device to receive a request from an endpoint to access, via a network associated with the first device, a resource protected by a second network device that differs from the first network device;
one or more instructions which, when executed by the first network device, cause the first network device to determine, based on the request, to grant, to the endpoint, access to the network;
one or more instructions which, when executed by the first network device, cause the first network device to determine that the second device would deny, based on the request, access by the endpoint to the resource;
one or more instructions which, when executed by the first network device, cause the first network device to request, based on determining that the second device would deny access by the endpoint to the resource and from a network admission control (NAC) device, authentication data pertaining to the endpoint, the NAC device being different from the first network device and the second network device, and the authentication data relating to the endpoint accessing the resource through the second network device;
one or more instructions which, when executed by the first network device, cause the first network device to receive the authentication data from the NAC device; and
one or more instructions which, when executed by the first network device, cause the first network device to transmit the authentication data to the endpoint.

19. The non-transitory computer-readable medium of claim 18, where the authentication data includes:
one or more security policy parameters, and
where the non-transitory computer-readable medium further comprises:
one or more instructions which, when executed by the first network device, cause the first network device to configure the one or more security policy parameters based on the endpoint.

20. The non-transitory computer-readable medium of claim 18, where the NAC device includes an interface for metadata access points (IF-MAP) server, and
where the non-transitory computer-readable medium further comprises:

one or more instructions which, when executed by the first network device, cause the first network device to determine IF-MAP data pertaining to the endpoint based on the request; and one or more instructions which, when executed by the first network device, cause the first network device to publish the IF-MAP data pertaining to the endpoint to the IF-MAP server, the IF-MAP server determining the authentication data based on the published IF-MAP data pertaining to the endpoint.

21. The non-transitory computer-readable medium of claim 20, where the first network device includes an IF-MAP client to execute the one or more instructions to determine the IF-MAP data, and the one or more instructions to publish the IF-MAP data.

22. A non-transitory computer-readable medium comprising:

one or more instructions which, when executed by a processor, cause the processor to receive a request, from an endpoint, to access a resource in a network, access to the resource being regulated by the processor;

one or more instructions which, when executed by the processor, cause the processor to deny, based on the request, access by the endpoint to the resource based on the request and a security policy for accessing the resource;

one or more instructions which, when executed by the processor, cause the processor to determine, based on denying the request, to acquire additional data pertaining to the endpoint;

one or more instructions which, when executed by the processor, cause the processor to request, from a network admission control (NAC) device, the additional data pertaining to the endpoint;

one or more instructions which, when executed by the processor, cause the processor to receive the additional data from the NAC device; and one or more instructions which, when executed by the processor, cause the processor to publish, to the NAC device, information associated with the request and security policy parameters that will permit the endpoint to access to the resource.

23. The non-transitory computer-readable medium of claim 22, where the security policy parameters are based on the request and the additional data, where the NAC device includes an interface for metadata access points (IF-MAP) server, and where the additional data includes IF-MAP data.

* * * * *